June 23, 1936.  A. KUNTKE  2,045,034
DEVICE FOR HEATING INCANDESCIBLE CATHODES
Filed Feb. 13, 1936
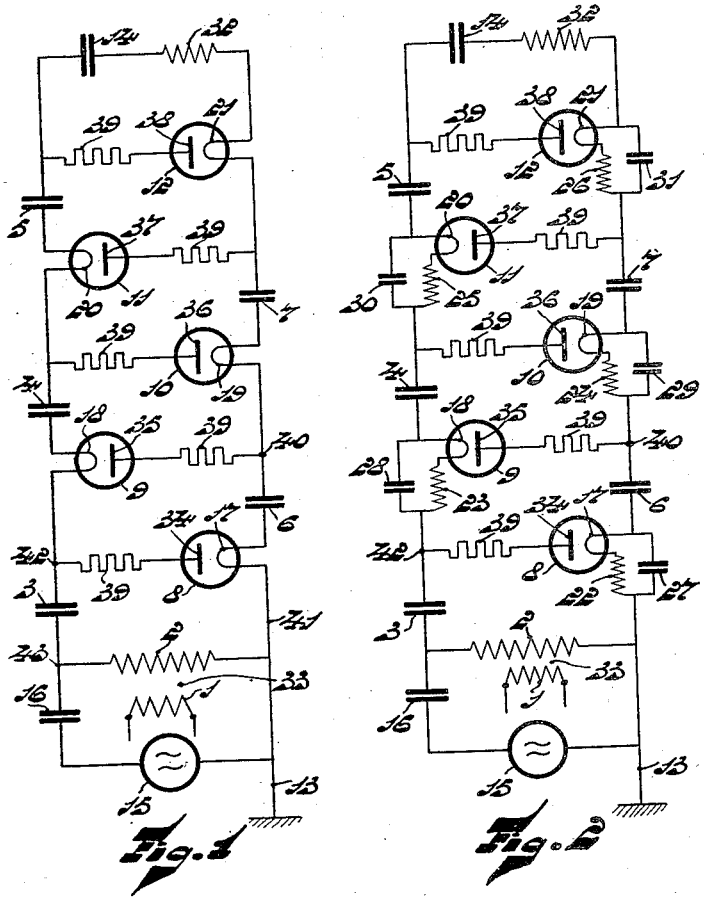
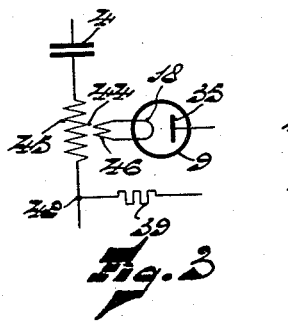
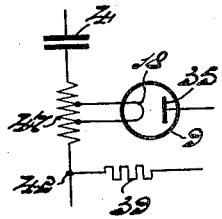
INVENTOR
ALFRED KUNTKE
BY
ATTORNEY.

Patented June 23, 1936

2,045,034

UNITED STATES PATENT OFFICE 2,045,034

DEVICE FOR HEATING INCANDESCIBLE CATHODES

Alfred Kuntke, Eindhoven, Netherlands, assignor to N. V. Philips' Gloeilampenfabrieken, Eindhoven, Netherlands Application February 13, 1936, Serial No. 63,781
In Germany February 8, 1935

5 Claims. (Cl. 175—363)

My invention relates to a device for heating incandescible cathodes which operate at high potentials.

My invention is particularly adapted for use in device for producing high direct voltages from an alternating voltage source, and in which one or more high-tension condensers and incandescible cathode rectifying tubes are used. Such devices are known as voltage multipliers and one form of such a device has been described in the U. S. Patent No. 1,974,328 to Albert Bouwers.

The heating of the incandescible cathodes of these rectifier tubes involves great difficulties, as due to the high voltages existing in the device the cathodes during operation are at very high potentials with regard to ground. It has been proposed to heat these cathodes by means of heating current transformers, directly energized from the low voltage network. However, in this method the secondary windings of the transformer have to be insulated from the alternating current source (and from ground) for the full high potential of the incandescible cathode. Due to this the heating current transformers are bulky and expensive, especially when required to heat a plurality of such high-potential cathodes.

To avoid this difficulty, storage batteries or rotary generators have been used for the heating of the incandescible cathodes, as described in the above patent. Storage batteries, however, require careful supervision and are not adapted for continuous operation as they must be periodically charged, whereas rotary generators are expensive and have the general mechanical disadvantages of rotating machinery, besides creating disturbing noises.

The object of my invention is to overcome in a device of the above type the disadvantages inherent in the above-mentioned heating current sources and to heat the incandescible cathodes in a simple and reliable manner.

In accordance with the invention, I heat the incandescible cathodes of devices of the above type by means of high-frequency current passing through the high-tension condenser of such devices, or, if a plurality of high-tension condensers are used through at least one of the condensers.

In devices for producing high direct-voltages from an alternating voltage and comprising a plurality of high-tension condensers between which two or more incandescible cathode rectifier tubes are connected, I provide one or more auxiliary circuits for heating the cathodes, which circuits include a source of high-frequency current and at least part of the condensers.

Such an arrangement is particularly advantageous when the groups of high tension condensers are connected through an auxiliary impedance which allows the passage of high-frequency heating current but which blocks the passage of pulsating direct current. Such an impedance may consist of a condenser and an inductance connected in series, and tuned to the frequency of the heating current to obtain voltage resonance. In such an arrangement, the ends of the condenser chain through which the high-frequency alternating current passes are at a comparatively low voltage and the high-frequency source does not have to be insulated for a particularly high potential.

The invention may be carried into effect in a simple manner by connecting the incandescible cathodes between successive high-tension condensers whereby all of the high-frequency current passes through the condensers. However, to reduce the amount of high-frequency current passing through the condensers, I prefer to provide each cathode to be heated with a transformation circuit, preferably a resonance circuit. Due to this the voltage losses in the condensers and particularly the ohmic losses are avoided or at least greatly reduced.

In devices in which the condenser groups are connected one behind the other, the tubes form a short circuit for the high-frequency current, and to prevent this I provide in the anode lead of each tube a blocking resistance which blocks the high-frequency current and also serves as a damping resistance for the direct current system.

In order that my invention will be clearly understood and readily carried into effect, I shall describe same more fully with reference to the accompanying drawing in which Figure 1 is a diagram of a circuit arrangement for producing high direct voltages from an alternating voltage and illustrates my invention.

Figure 2 is a diagram similar to that of Fig. 1 and illustrates another embodiment of my invention.

Figures 3 and 4 are diagrams representing a detail of a circuit arrangement according to my invention and illustrate other modifications.

The circuit arrangement shown in Figure 1 comprises, as a low-frequency alternating-voltage supply, a transformer 33 having a secondary winding 2, and a primary winding 1 connected to a suitable source of low-frequency alternating current, for instance the standard 50 or 60 cycle supply. The installation comprises five rectifying tubes 8, 9, 10, 11 and 12 having incandescible cathodes 17, 18, 19, 20 and 21 respectively and anodes 34, 35, 36, 37 and 38 respectively. The tubes 8, 9, 10, 11 and 12 are series-connected with the anode of one tube connected through a blocking resistance to the cathode of the succeeding tube. For instance, anode 34 is connected through a blocking resistance 39 to the cathode 18; anode 35 is connected through a second blocking resistance 39 to the cathode 19 and similarly for the remaining tubes.

Each two successive tubes are bridged by a high-tension condenser, for instance a high-tension condenser 6 bridges the tubes 8 and 9 and for this purpose has one electrode connected to one end of cathode 17 and its other electrode connected to a point 40 between the resistance 39 and cathode 19. In a similar manner the tubes 9 and 10; 10 and 11; 11 and 12; are bridged by high-tension condensers 4, 7 and 5 respectively.

The secondary winding 2 has one end connected through a conductor 41 to ground at 13 and to the cathode 17, whereas its other end is connected through a high-tension condenser 3 to the point 42 between resistance 39 and cathode 18.

Connected with one terminal to the conductor 41 and with its other terminal through a separating condenser 16 to the point 43 is a source of high-frequency heating current 15. The high-frequency source 15 supplies current of such frequency that there is practically no capacitive voltage losses in the condensers and of such strength that the incandescible cathodes are brought to their emission temperature. For this purpose a frequency of, for instance, 750 kilocycles, and in the case of oxide cathodes, a current strength of about 3.5 amperes are used. The high frequency source does not require a power of more than 8 watts.

As a source of high-frequency current, a rotary generator or a valve transmitter may be used. The latter has the advantages that it is noiseless in operation, does not require supervision, and there is no question of moving parts.

The high-tension condensers 3, 4, 5, 6 and 7 have a capacity of about 0.01 microfarads, each and mutually form two groups; one group consisting of condensers 3, 4 and 5 and the second group consisting of condensers 6 and 7. These groups are connected through an auxiliary impedance consisting of a condenser 14 and an inductance coil 32. This impedance i. e. condenser 14 and coil 32 are tuned to the frequency of the high-frequency current, whereby it allows the passage of the high-frequency current, but blocks the flow of pulsating direct current. The condenser 14 has a capacity of about 0.001 microfarads, whereas the coil 32 has a self-inductance of, for instance, about 0.5 mh.

The high-frequency heating current flows from one side of the high-frequency source 15 through cathode 17, condenser 6, cathode 19, condenser 7, cathode 21, coil 32, condensers 14 and 5, cathode 20, condenser 4, cathode 18, and back through condensers 3 and 16 to the other side of source 15.

The blocking resistances 39 serve to prevent a short circuit of the high-frequency heating circuit and also serve as damping resistances for the direct current system.

As the metal electrodes of the ordinary high-tension condensers have a comparatively high ohmic resistance for the high-frequency current, the resulting ohmic losses may deleteriously affect the efficiency of the high-frequency source. To prevent this, as shown in Fig. 3 a current transformer 44 having a primary winding 45 and a secondary winding 46 may be provided for each tube. Instead of a current transformer with separate windings an autotransformer 47 may be used as shown in Fig. 4. Although the showings of Figs. 3 and 4 are given for cathode 18 of tube 9, they are applicable to each of the cathodes 17—21.

However, to reduce the transformation losses I prefer to provide a resonance circuit for each cathode. The use of a resonance circuit for each tube is illustrated in Fig. 2 which is otherwise similar to Fig. 1 and in which similar parts are denoted by similar reference numerals. Thus in Fig. 2, each cathode, instead of forming the connections between the successive condensers, is included in a resonance circuit. For instance, the incandescible cathode 17 is connected in series with a choke coil 22 and a condenser 27 is connected in parallel to this series connection. In a similar manner cathodes 18, 19, 20 and 21 are included in resonance circuits containing condensers 28, 29, 30 and 31 respectively and choke coils 23, 24, 25 and 26 respectively.

The capacity of the condensers 27 to 30 and the self-inductance of the choke coils 22 to 26 should be so selected—taking into account the impedance of the cathode—that a circuit tuned to the frequency of the high-frequency source 15 is formed; this being effected in known manner.

In the circuit arrangement of Fig. 2, the high-frequency source 15 has to supply only a low current strength, whereas a much larger current passes through the incandescible cathodes which form part of the resonance circuits. For instance with a current output of 0.2 amperes of the high-frequency source 15, a heating current of about 3.5 amperes will pass through the cathodes. On the other hand as the voltage losses in the condensers 3 to 7 and 14 and 16 are considerably reduced, the voltage of the high-frequency source may be the same or only slightly higher than that used in the circuit arrangement of Fig. 1.

While I have described my invention in connection with specific examples and applications, I do not wish to be limited thereto, but desire the appended claims to be construed as broadly as permissible in view of the prior art.

What I claim is:

1. A device for producing high direct-voltages from an alternating voltage, comprising an alternating-voltage source, at least two high-tension condensers, a plurality of discharge tubes connected between said condensers, each of said tubes having an incandescible cathode, and means for heating said cathodes, said means comprising at least one auxiliary circuit including said cathodes and at least one of said condensers, and a source of high-frequency current in said circuit.

2. A device for producing high direct-voltages from an alternating-voltage comprising an alternating-voltage source, at least two groups of high-tension condensers, a plurality of discharge tubes connected between said groups, each of said tubes having an incandescible cathode, an auxiliary impedance connecting said groups of condensers, said impedance allowing the passage of high-frequency current and blocking the flow of pulsating direct current, at least one auxiliary circuit for heating said cathode and including at least one of said condensers, and a source of high-frequency current in said circuit.

3. A device for producing high direct-voltages from an alternating voltage comprising an alternating-voltage source, at least two groups of high-tension condensers, a plurality of discharge tubes connected between said groups of condensers, each of said tubes having an incandescible cathode, and means for heating said cathodes with high-frequency current, said means comprising at least one auxiliary circuit including at least one of said condensers, a transformation circuit for each cathode, and a source of high-frequency alternating current, the high-frequency current passing through the high-tension condensers being less than the high-frequency current passing through the cathodes.

4. A device for producing high direct-voltages from an alternating-voltage comprising an alternating-voltage source, at least two groups of high-tension condensers, a plurality of discharge tubes connected between said groups of condensers, each of said tubes having an incandescible cathode, and means for supplying high-frequency heating current to said cathodes, said means comprising at least one auxiliary circuit including at least one of said condensers, a source of high-frequency alternating current in said auxiliary circuit, and a resonance circuit for each cathode, said resonance circuit being tuned to the frequency of the high-frequency current to cause the high-frequency current passing through the high-tension condensers to be lower than the high-frequency current passing through the cathodes.

5. A device for producing high direct-voltages from an alternating voltage, comprising an alternating-voltage source, at least two groups of high-tension condensers, a plurality of discharge tubes connected between said groups of condensers, each of said tubes having an anode and an incandescible cathode, means for supplying high-frequency heating current to said cathodes, said means comprising at least one auxiliary circuit including said cathodes and a portion of said condensers, and a source of high-frequency current, and a blocking resistance connected to the anode of each tube to block the flow of high-frequency current.

ALFRED KUNTKE.